United States Patent [19]

Reimer

[11] 3,731,157

[45] May 1, 1973

[54] PRINTED WIRING CARD GUIDE SHELF AND A METHOD FOR MANUFACTURE THEREOF

[75] Inventor: William A. Reimer, Wheaton, Ill.

[73] Assignee: GTE Automatic Electric Laboratories Incorporated, Northlake, Ill.

[22] Filed: Sept. 1, 1971

[21] Appl. No.: 176,895

[52] U.S. Cl........317/101 DH, 317/101 CW, 113/116

[51] Int. Cl...........H05k 7/18

[58] Field of Search..........317/101 CW, 101 D, 317/101 DH, 117, 118

[56] References Cited

UNITED STATES PATENTS

| | | | |
|---|---|---|---|
| 3,563,391 | 2/1971 | Weltha | 317/101 DH |
| 3,640,399 | 2/1972 | Hartman | 317/117 |
| 3,609,464 | 9/1971 | Stone | 317/101 DH |
| 3,258,650 | 6/1966 | Fiege | 317/101 DH |

FOREIGN PATENTS OR APPLICATIONS

| | | | |
|---|---|---|---|
| 1,134,126 | 8/1962 | Germany | 317/101 DH |

*Primary Examiner*—Robert K. Schaefer
*Assistant Examiner*—Gerald P. Tolin
*Attorney*—K. Mullerheim, B. E. Franz, R. F. Van Epps and Theodore C. Jay, Jr.

[57] ABSTRACT

A printed wiring card guide shelf is stamped as a unitary structure from a single sheet of stock material and formed to provide alignment and support for printed wiring cards.

7 Claims, 3 Drawing Figures

PATENTED MAY 1 1973 3,731,157

INVENTOR
WILLIAM A. REIMER

BY Robert H. Van Epps
ATTORNEY

PRINTED WIRING CARD GUIDE SHELF AND A METHOD FOR MANUFACTURE THEREOF

BACKGROUND OF THE INVENTION

1. Field of the Invention

The present invention relates most generally to the field of printed wiring card files and more particularly to a new and improved one piece card guide shelf.

2. Description of the Prior Art

Printed wiring cards have commonly been mounted in and supported by card guides which are part of a generally box-like structure which houses the wiring cards. A very wide variety of printed wiring card files have been developed and many have come into extensive use in the electronics industry. These card files are usually fabricated to meet particular requirements of a given application and are generally of little utility in other applications. These card files are further usually optimized for a specific characteristic such as economy of fabrication, ease of assembly, card alignment, identification or designation features or structural strength. All of these features may be individually met by one or another card file but their simultaneous achievement in a single card file has not been made prior to the present invention.

OBJECTS AND SUMMARY OF THE INVENTION

From the foregoing discussion it will be understood that among the various objectives of the present invention are:

to provide a new and novel printed wiring card guide shelf as an article of manufacture;

to provide an article of the above described character formed as a unitary structure from a single sheet of stock material; and to provide an article of the above-described character which is of simplified construction, is easily assembled, and provides card alignment, identification and designation.

These as well as other objectives of the present invention are efficiently achieved by providing a shelf blank stamped from a single sheet of stock which is formed to provide front and rear longitudinal supporting members joined by a plurality of transverse printed wiring card guide channels. Wiring card alignment guides are integrally formed in the front and rear longitudinal supporting members and a mounting flange may be integrally formed at each end of the shelf.

These and other objects, features and advantages of the present invention will become more apparent from the following detailed description taken in conjunction with the appended drawings.

DESCRIPTION OF PREFERRED EMBODIMENT

Figures 1, 2, 3:
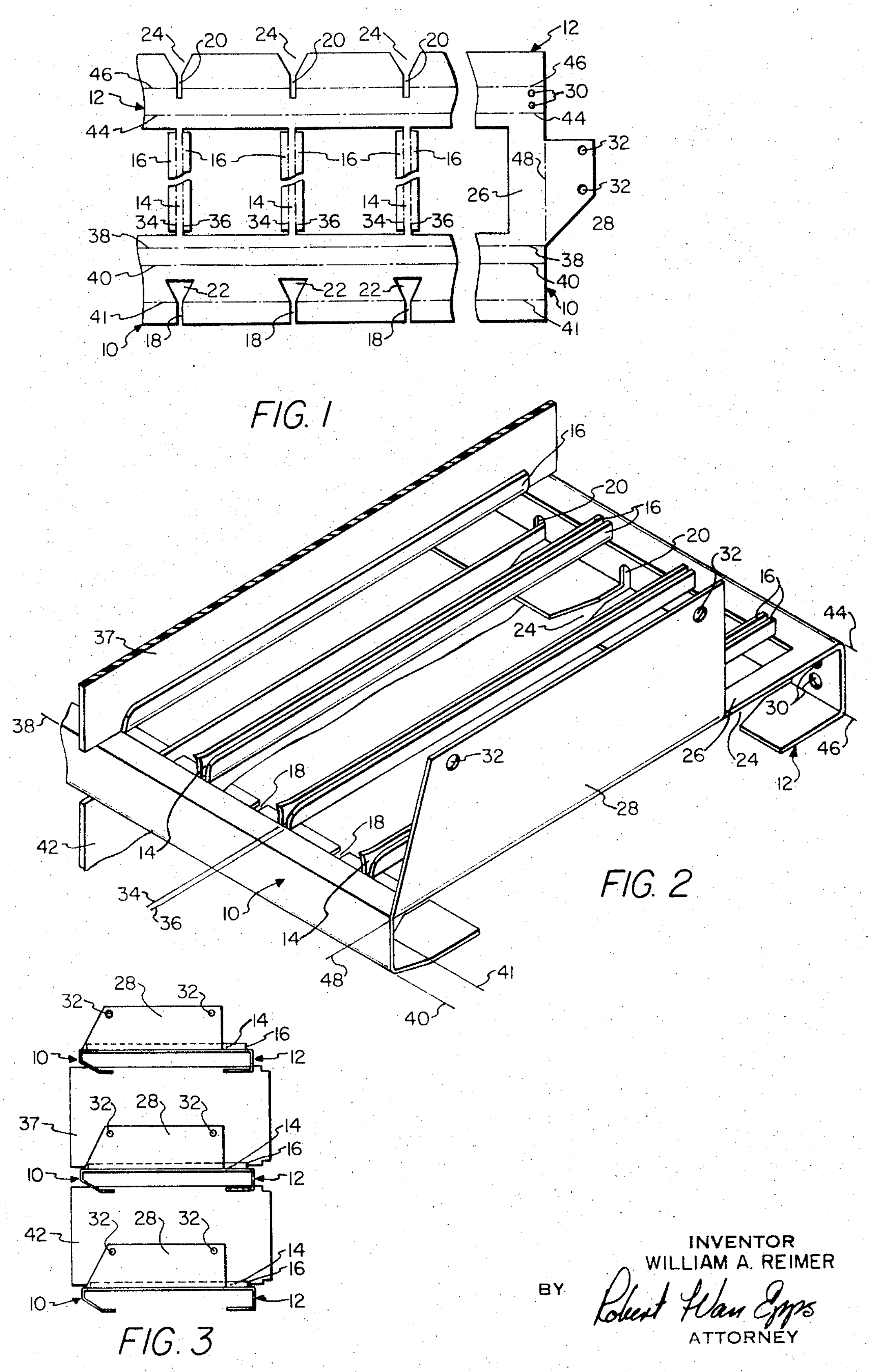
FIG. 1 is a top view of the shelf blank used in the formation of the article of the present invention.
FIG. 2 is a perspective view of a printed wiring card guide shelf in accordance with the present invention.
FIG. 3 is an end view of a vertical array of the printed wiring card guide shelves of FIG. 2.

The printed wiring card guide shelf of the present invention is an article of manufacture, being formed as a unitary structure from a single sheet of stock material. A shelf blank is illustrated in FIG. 1 and is preferably stamped or cut from a sheet of metal. The blank has first and second logitudinally extending rectangular portions 10 and 12, respectively. These portions are joined together at their facing longitudinal edges by transversely extending portions 14 each of which is provided with rectangular tab portions 16 on either edge. The tab portions 16 are slightly shorter than the transverse portions 14 at either end. Each rectangular portion 10 and 12 is provided with transverse rectangular slots or notches 18 and 20 respectively which extend to the edges of the portions 10 and 12 and which are aligned with the transversely extending portions 14. It is further preferred in the practice of this invention that the first or front rectangular portion 10 be provided with a plurality of generally triangular apertures 22; the apex of each triangle being in communication with one of the rectangular notches 18 and the base disposed toward the transversely extending portions 14. In a similar manner, the second or rear rectangular portion 12 may be provided with a like plurality of triangular notches 24 having the apex of each in communication with a rectangular slot 20, and the base coincident with the outer longitudinal edge of portion 12.

The shelf blank may further be provided at each end with a terminal cross member 26 which has formed at a portion of its outer edge a generally trapezoidal tab 28. As will be described hereinbelow, printed wiring card connector guide apertures 30 may be provided in the second or rear rectangular portion 12 of the blank and shelf mounting apertures 32 may be provided in the trapezoidal portion 28.

The forming lines for the card guide shelf are shown in FIG. 1 and will be described with reference to FIG. 2 wherein like portions and forming lines are identified by like reference numerals.

In forming the card guide shelf of FIG. 2 from the shelf blank of FIG. 1 the tab portions 16 of the transversely extending portions 14 are bent upwardly along forming lines 34 and 36 thus forming a printed wiring card guide channel on the upper surface of the blank adapted to receive and support upper wiring card 37. The card receiving end of each tab portion 16 may be splayed slightly outward to facilitate wiring card insertion. The first rectangular portion 10 is bent downward at a substantially right angle to the plane of the blank along a first longitudinal axis 38. It is bent downwardly and inwardly along a second longitudinal axis 40, and bent inwardly along a third longitudinal axis 41 which lies along the points of juncture between the rectangular slots 18 and triangular apertures 22, thus forming a forward lower card alignment guide for lower wiring card 42. In a similar fashion the second or rear rectangular portion 12 is bent downwardly at a substantially right angle to the plane of the blank along a first longitudinal axis 44 and bent inwardly along a second longitudinal axis 46 disposed along the rectangular notches 20. A rear lower card alignment guide adapted to engage the top rear edge of wiring card 42 is thus provided. Finally, the trapezoidal end tab 28 is bent upwardly along transverse forming line 48 such that the tab is substantially normal to the plane of the shelf blank. The shelf mounting apertures 32 in the end tab 28 may thus be used to secure the shelf to any desired type of end plate (not shown) to form vertical arrays of printed wiring card file space. Such a vertical array is schematically illustrated in the end view of FIG. 3 wherein elements described hereinabove are identified by like reference numerals. This view better illustrates the manner in which vertically adjacent printed wiring cards 37 and 42 are inserted between two card guide shelves of the type illustrated in FIG. 2. Again the tabs 16 extending upwardly of transverse portion 14 provide a channel into which the lower edge of wiring cards 37 and 42 may be inserted and the forward and rear portions 10 and 12 are bent such that the aperture and notch arrangements receive the upper edges of the cards 37 and 42 to maintain them in proper alignment.

The article of this invention is thus formed in a single piece and requires no further assembly prior to mounting at a desired spacing in any suitable rack. It is not a box structure as typifies the prior art and each shelf provides the guide surfaces for two printed wiring cards; the lower edge of the card above and the upper edge of that below. Where previously there were required two separate guide sections nor horizontal row of wiring cards, the present invention permits the use of only one per row (plus, of course, one at the top of the uppermost row in a frame). The number of individual parts required to form a card file is drastically reduced. Further, since the edge of the card guide shelf fills substantially the entire vertical space between adjacent printed wiring cards a maximum card designation surface and an optimum arrangement for providing maximum wiring card support is provided.

The vertical portion of rear card guide 12 provides sufficient working surface such that the apertures 30 for indexing connector panel locator pins (not shown) to the card guide shelf may easily be provided. Through the use of the integrally formed trapezoidal tab 28 to mount the card guide shelf to a frame, the tolerance "-build-up" problems encountered with card files formed of individual shelf, connector and frame combinations may be eliminated. The connector supports may be rigidly fastened to the frame and the card guide shelf may then be accurately located via apertures 30 to the connector supports. Any shelf-to-frame misalignment may easily be compensated through slight deflection of the trapezoidal tab 28. Finally, it will be seen that a card guide shelf in accordance with the present invention may easily be installed in or removed from a frame.

It will be apparent that, given the configuration of the article of the present invention, the method for its manufacture becomes clear. The shelf blank illustrated in FIG. 1 may simply be die-stamped from sheet stock of any desired material. Once the blank is made the card guide shelf is finished by forming the blank along the illustrated forming lines.

From the foregoing it will be understood that the Applicant has provided a new and novel printed wiring card guide shelf and a method for its manufacture whereby the objects set forth hereinabove are efficiently achieved. Since certain changes in the foregoing article will occur to those skilled in the art without departure from the scope of the invention it is intended that all matter contained in the above description or shown in the appended drawings shall be interpreted as illustrative and not in a limiting sense.

Having described what is new and novel and desired to secure by Letters Patent, what is claimed is:

1. The method of manufacturing a printed wiring card guide shelf comprising the steps of
   forming a planar shelf blank having first and second, parallel, spaced apart, longitudinally extending rectangular portions each joined at a plurality of positions along adjacent longitudinal edges to the other by a plurality of transversely extending portions each being provided on each edge thereof with an integrally formed rectangular tab portion of lesser length than said transversely extending portions, said first and second rectangular portion each having a plurality of rectangular notches, each said notch extending transversely to the outer edge of said rectangular portions and in alignment with one of said transversely extending portions;
   bending said tab portions upwardly of said transversely extending portions to thereby form a plurality of lower card guide channels;
   bending said first rectangular portion downwardly along a first longitudinal axis dispersed outwardly of said transversely extending portions, inwardly and downwardly along a second longitudinal axis disposed intermediate said first longitudinal axis and said notches and inwardly along a third longitudinal axis intersecting said notches; and
   bending said second rectangular portion downwardly along a fourth longitudinal axis disposed outwardly of said transversely extending portions, and inwardly along a fifth longitudinal axis intersecting said notches.
2. The method of claim 1 further including the step of
   forming at each end of said blank an integral terminal cross member extending transversely between said first and second rectangular portions and including a tab portion at a part of the outer edge thereof, and
   bending said tab portions upwardly along a transverse axis disposed at the ends of said rectangular portions.
3. The method of claim 1 further including the step of
   forming a plurality of alignment apertures in the downwardly extending portion of said second rectangular portion between said fourth and fifth longitudinal axes.
4. A printed wiring card guide shelf comprising
   a forward longitudinal supporting member;
   a rear longitudinal supporting member spaced apart from and parallel with said forward longitudinal supporting member;
   a plurality of transversely extending members integrally formed with and joining the adjacent longitudinal edges of said forward and rear longitudinal supporting members;
   each said transversely extending member having first and second integrally formed upwardly extending, rectangular tab portions of lesser length than said transversely extending member to thereby provide a lower card guide channel;
   said forward longitudinal supporting member having a first rectangular portion with one edge of which one end of said transversely extending members are formed, a second rectangular portion extending downwardly from said first rectangular portion opposite said transversely extending members, a third rectangular portion extending inwardly and downwardly from said second rectangular member, and having a plurality of transverse openings disposed therein in alignment with said transversely extending members which openings are adapted to receive printed wiring cards, a fourth rectangular portion extending inwardly from said third rectangular portion in a plane substantially parallel to said first rectangular portion, and having a plurality of transverse slots disposed therein in communication with said transverse openings in said third rectangular portion, and the plurality of openings in said third rectangular portion and slots in said fourth rectangular portion forming a forward upper wiring card alignment guide, said rear longitudinal supporting member having a first rectangular portion with one edge of which the opposite end of said transversely extending members are formed, a second rectangular portion extending downwardly from said first rectangular portion opposite said transversely extending member, and having a plurality upwardly extending of slots disposed therein in alignment with said transversely extending member, a third rectangular portion extending inwardly from said second rectangular portion and having a plurality of transverse openings disposed therein in communication with said slots in said second rectangular portion, and the plurality of slots in said second rectangular portion and openings in said third rectangular portion forming rear upper wiring card alignment guides, and said forward and rear longitudinal supporting members and said plurality of transversely extending members being integrally formed in a unitary structure from a single piece of material.

5. An article as recited in claim 4 wherein the transverse openings in the third rectangular portion of said forward longitudinal supporting member are triangular apertures each having an apex in communication with a corresponding slot in the fourth rectangular portion of said forward longitudinal supporting member such as to provide an inwardly tapered forward wiring card alignment guide, and the transverse openings in the third rectangular portion of said rear longitudinal supporting member are triangular apertures each having a base which is coincident with the inner edge of said third rectangular portion and an apex in communication with a corresponding slot in the second rectangular portion of said rear longitudinal supporting member such as to provide an inwardly tapered rear wiring card alignment guide.

6. An article as recited in claim 4 further including a terminal cross member integrally formed with and joining the adjacent longitudinal edges of the first rectangular portions of said forward and rear longitudinal supporting members at the ends thereof, each said cross member having an upwardly extending tab portion to thereby form a card guide shelf supporting means at each end of said shelf.

7. An article as recited in claim 4 wherein the ends of each upwardly extending rectangular tab portion of each said transversely extending member diverge from one another to thereby provide an inwardly tapered lower wiring card alignment guide.

* * * * *